US012664323B2

(12) United States Patent
Newell

(10) Patent No.: US 12,664,323 B2
(45) Date of Patent: Jun. 23, 2026

(54) TAMPER DETECTOR BASED ON POWER NETWORK ELECTRICAL CHARACTERISTIC

(71) Applicant: Microsemi SoC Corp., Chandler, AZ (US)

(72) Inventor: Gerald Richard Newell, Tracy, CA (US)

(73) Assignee: Microsemi SOC Corp., Chandler, AZ (US)

( * ) Notice: Subject to any disclaimer, the term of this patent is extended or adjusted under 35 U.S.C. 154(b) by 256 days.

(21) Appl. No.: 18/517,348

(22) Filed: Nov. 22, 2023

(65) Prior Publication Data

US 2024/0403495 A1 Dec. 5, 2024

Related U.S. Application Data

(60) Provisional application No. 63/469,634, filed on May 30, 2023.

(51) Int. Cl.
| | |
|---|---|
| *G06F 21/75* | (2013.01) |
| *G06F 17/14* | (2006.01) |
| *H03M 3/00* | (2006.01) |

(52) U.S. Cl.
CPC .......... *G06F 21/755* (2017.08); *G06F 17/141* (2013.01); *H03M 3/456* (2013.01)

(58) Field of Classification Search
CPC ..... G06F 21/755; G06F 17/141; H03M 3/456
See application file for complete search history.

(56) References Cited

U.S. PATENT DOCUMENTS

| | | | |
|---|---|---|---|
| 2002/0019962 A1 | 2/2002 | Roberts et al. | ............... 714/724 |
| 2012/0070098 A1* | 3/2012 | Gohshi | .................... G06T 5/10 382/263 |

| | | | |
|---|---|---|---|
| 2021/0057357 A1 | 2/2021 | Majerus et al. | |
| 2021/0097207 A1 | 4/2021 | Meriac et al. | |
| 2023/0401342 A1* | 12/2023 | Tajik | ....................... G06F 21/57 |

OTHER PUBLICATIONS

International Search Report and Written Opinion, Application No. PCT/US2023/081259, 16 pages, Mar. 11, 2024.
Mosavirik, Tahoura et al., "ImpedanceVerif: On-Chip Impedance Sensing for System-Level Tampering Detection," Paper 2022/946, Cryptology ePrint Archive, URL: https://eprint.iacr.org/2022/946.pdf, 25 pages.

* cited by examiner

*Primary Examiner* — Baotran N To
(74) *Attorney, Agent, or Firm* — SLAYDEN GRUBERT BEARD PLLC

(57) ABSTRACT

Methods and systems for tamper detection based on power network electrical characteristic by storing a reference electrical signature of a power distribution network comprising the integrated circuit, generating in the integrated circuit a current stimulus waveform by sigma-delta based noise shaping, and providing the waveform to the power distribution network comprising the integrated circuit, sampling the power distribution network with a voltage-to-digital converter in the integrated circuit and estimating based at least partially on the sampled power distribution network a response electrical signature of the power distribution network responsive to the stimulus waveform, comparing on the integrated circuit the estimated response electrical signature and the reference electrical signature, and triggering by the integrated circuit a penalty based on a comparison of the response electrical signature and the reference electrical signature.

32 Claims, 5 Drawing Sheets

TAMPER DETECTOR BASED ON POWER NETWORK ELECTRICAL CHARACTERISTIC

PRIORITY

This application claims priority to U.S. Provisional Patent Application No. 63/469,634, filed May 30, 2023, the contents of which are hereby incorporated in their entirety.

TECHNICAL FIELD

The present disclosure relates to detection of physical and electronic tampering of printed circuit boards and processors that threatens the security of critical program information (CPI) in integrated circuit systems.

BACKGROUND

Integrated circuit systems are subject to information being extracted for malicious purposes. In particular, "mission critical" systems that use integrated circuit/board-based electronics may have Critical Program Information (CPI) that is threatened by physical tampering. Tampering activities that threaten information security within integrated circuit board-based processing systems include removing board capacitors, placing an electromagnetic (EM) probe near the integrated circuit, and removing a lid or shield, leading to extraction of CPI such as design intellectual property (IP) or cryptographic keys from the integrated circuit or other processors on the board. Active tamper events may include voltage or laser tampering, which can create malicious faults during the operation of a circuit that can lead to security failures such as loss of confidentiality or incorrect authentication. Monitoring attacks may extract secrets leaked through unwanted side channels such as power consumption or electromagnetic field emanations.

Physical tampering changes the physical structure and physical relationships of elements on, or in proximity to, the integrated circuit or board. Despite these changes, it may be difficult to detect if tampering is occurring using a simple run time test. Verification of tampering may require forensic dismantling and inspection of the target processor, after the fact, which may be too late. Predominantly electronic tampering, such as a non-invasive power or electromagnetic monitoring attack, may be difficult to detect because no external physical traces or evidence of tampering may be left behind. Most existing tamper sensors are unable to reliably detect monitoring.

Conventional approaches to detecting tampering activities involve after-the-fact, manual, physical inspection of the hardware for signs of tampering. Run-time detection might involve noticing a fault caused by a glitch or a protocol error (e.g., failed digital signature verification, or unusual JTAG activity), or an out-of-range environment (e.g., voltage or temperature), i.e., an active attack using purpose-built sensors. Passive monitoring attacks are much more difficult to detect during run-time. Most sensors today (e.g., a laser light detector) only detect one specific type of active attack, and even so there are bound to be some false negatives (e.g., the laser avoids the location of the light detector), therefore defense in depth is required.

Other than manual inspections, the industry currently does not have any strong capability to even detect, much less timely respond to certain types of tampering attempts (e.g., passive monitoring attacks) on Integrated Circuit/Board processors.

There is a need to detect tampers in real-time shortly after power-up and during run-time for currently operating electronic boards with integrated circuits and other components including potentially other processors, for example, microcontrollers.

SUMMARY OF THE INVENTION

Aspects provide methods, devices, and systems for detecting tampers in real time for currently operating electronic boards with integrated circuits and shortly after power-up for previously un-powered boards, so threats may be detected as they happen to facilitate near immediate mitigation and response.

Aspects provide a method comprising: storing a reference electrical signature comprising a power distribution network of the integrated circuit; generating in the integrated circuit a current stimulus waveform by sigma-delta based noise shaping, and providing the waveform to the power distribution network comprising the integrated circuit; sampling with a voltage-to-digital converter in the integrated circuit and estimating a response electrical signature of the power distribution network responsive to the stimulus waveform; comparing on the integrated circuit the estimated response electrical signature and the reference electrical signature; and triggering on the integrated circuit a penalty based on a comparison of the response electrical signature and the reference electrical signature.

According to another aspect, there is provided a method comprising: storing a reference electrical signature of a power distribution network comprising an integrated circuit; generating in the integrated circuit a current stimulus waveform by generating frequencies above the Nyquist frequency of the stimulus waveform samples using images of the fundamental frequency signals from their harmonic content due to their wave shape, and providing the waveform to the power distribution network comprising the integrated circuit; sampling the power distribution network with a voltage-to-digital converter in the integrated circuit and estimating a response electrical signature of the power distribution network responsive to the stimulus waveform; comparing on the integrated circuit the estimated response electrical signature and the reference electrical signature; and triggering on the integrated circuit a penalty based on a comparison of the response electrical signature and the reference electrical signature.

According to an aspect, there is provided an integrated circuit comprising: a processor; a power distribution network having a reference electrical signature; and a vector network analyzer of the power distribution network, the vector network analyzer in the integrated circuit, the vector network analyzer comprises: a waveform generator circuit to generate a current stimulus waveform by sigma-delta based noise shaping, and provide the waveform to the power distribution network; a voltage-to-digital converter circuit to sample voltage at a high frequency and estimate a response electrical signature of the power distribution network responsive to the stimulus waveform; and a comparison circuit to compare the estimated response electrical signature and the reference electrical signature; and a tamper detector circuit to trigger a penalty based on a comparison by the comparison circuit of the response electrical signature and the reference electrical signature.

According to another aspect, there is provided an integrated circuit comprising: a processor; a power distribution network having a reference electrical signature; and a vector network analyzer of the power distribution network, the vector network analyzer in the integrated circuit, the vector network analyzer comprises: a waveform generator circuit to generate a current stimulus waveform by generate frequencies above the Nyquist frequency using images of the fundamental frequency signals from their harmonic content due to their wave shape, and provide the waveform to the power distribution network; a voltage-to-digital converter circuit to sample a voltage at a high frequency and estimate a response electrical signature of the power distribution network responsive to the stimulus waveform; and a comparison circuit to compare the estimated response electrical signature and the reference electrical signature; and a tamper detector circuit to trigger a penalty based on a comparison by the comparison circuit of the response electrical signature and the reference electrical signature.

BRIEF DESCRIPTION OF THE DRAWINGS

The figures illustrate examples of integrated circuits and methods for detecting tampering by sensing changes in a dynamic electrical characteristic of the Power Distribution Network (PDN) of an integrated circuit and the printed circuit board to which it is attached.

Figure 1:
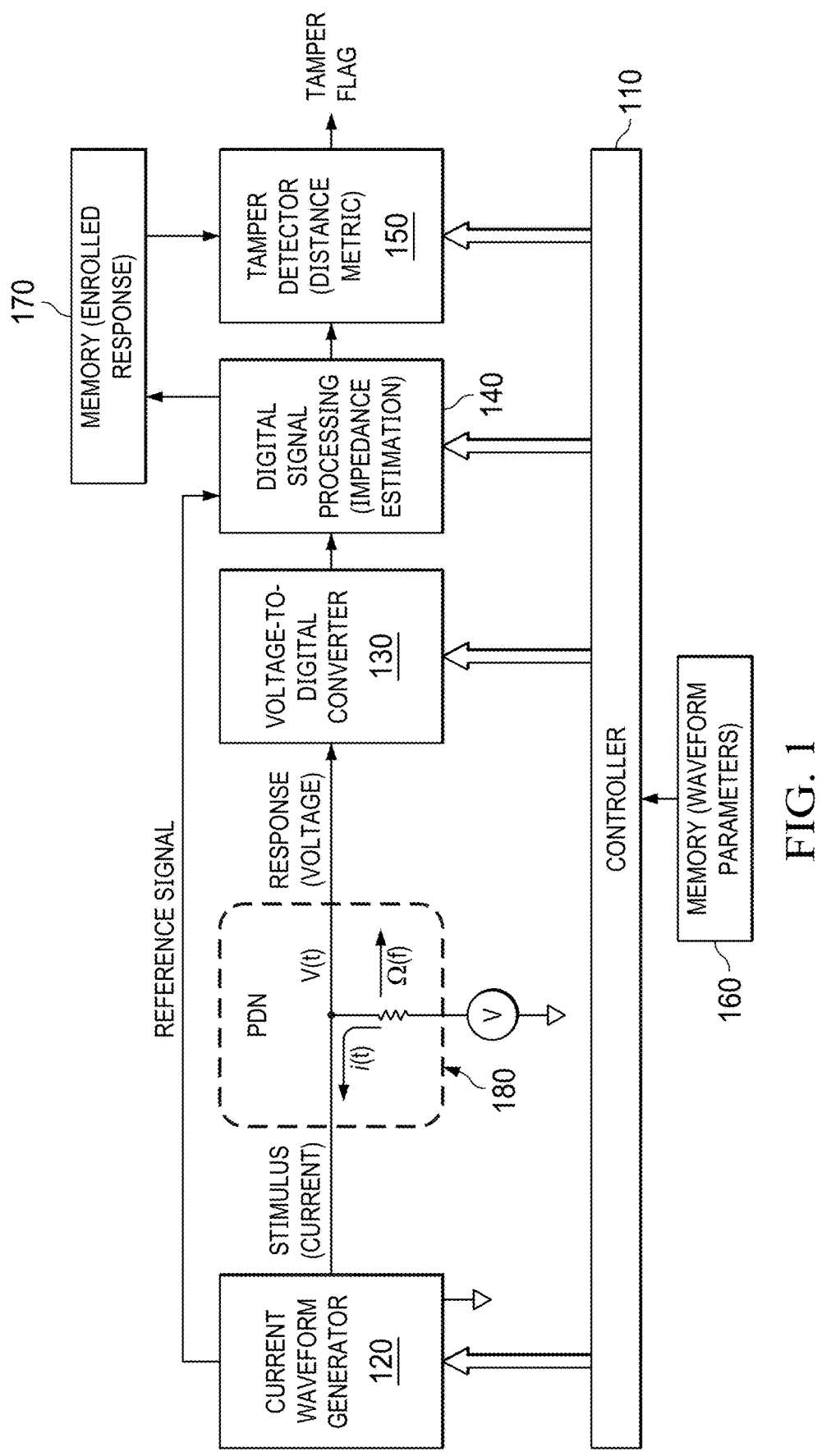
FIG. 1 shows a block diagram of a system for a PDN vector network analyzer that detects changes in the PDN signature electrical characteristic to detect tampering.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect, there is provided an implementation in an integrated circuit a power distribution network (PDN) electrical characteristic analysis functionality programmed in one or more integrated circuits. For example, the PDN electrical characteristic may be a voltage signature or an impedance signature. Integrated circuits include application-specific integrated circuits (ASIC), application-specific standard parts (ASSP), system-on-chip field-programmable gate arrays (SoC FPGA), and field-programmable gate arrays (FPGA). With the integrated circuit(s) in situ the frequencies/waveforms for detecting tampering may be determined and an electrical signature of the PDN at these frequencies recorded in the integrated circuit's on-chip embedded non-volatile memory (eNVM), or alternatively in off-chip persistent memory that is securely loaded at boot time, as a "golden signature", i.e. an electrical characteristic signature defined as a true signature to be used as a base for analysis. Significant deviations from this golden signature are interpreted as tamper events that can be used to trigger penalties such as zeroization or erasure of critical secrets like cryptographic keys, resetting the integrated circuit, or setting a tamper flag to notify other parts of the system that an attack may be underway so it can take corrective action.

The use of a PDN electrical characteristic signature, and comparison with a golden signature, may be universally applied to most electronic board systems, especially those already containing an integrated circuit. For example, the PDN electrical characteristic and golden signatures may be voltage signatures or impedance signatures. An aspect provides a universal and automated solution to tamper detection that may be provided independently, or integrated into all types of processors on circuit boards.

The PDN electrical characteristic analysis functionality may detect changes outside the integrated circuit itself, e.g., changes at the board level, or objects in proximity to the integrated circuit. Objects are proximate to the integrated circuit when they are close enough to make a change in the measured PDN electrical characteristics, e.g., by modifying the EM field generated by a Vector Network Analyzer (VNA). In practice, objects that touch the device (even though the device is covered with an insulator) or are positioned near (almost touching, within about 1 cm) may be close enough to make a change in the measured PDN electrical characteristics.

The use of a PDN electrical signature and comparison with a golden signature may detect tamper attempts in real time on operating systems, and may detect tamper attempts on previously un-powered processors immediately after power-up, if there is any detectable persistence in the change in PDN electrical characteristics (voltage or impedance), which may be the result of an adversarial modifications that may have been made while the power was off.

Aspects provide an integrated circuit for detecting tampering by sensing changes in the electrical signature of a PDN in the integrated circuit and in the board to which it is attached. Small measurable changes in the electrical characteristics of the PDN of a chip/circuit board may signal these types of tamper activities. A Vector Network Analyzer (VNA) may detect these changes in the PDN. The VNA may be Soft IP in an FPGA or a hardened circuit in an ASIC or ASSP. Creating a reference PDN electrical signature or "Golden Signature" for an in-place integrated circuit may allow the VNA to detect variations from this baseline that indicate tampering, e.g., using the Wasserstein Distance metric. The Wasserstein metric is a function that gives a distance between two probability distributions. The $p^{th}$ ($p \geq 1$) Wasserstein distance between a first probability distribution $\gamma i$ and a second probability distribution $\tau i$ is given by $$W_p(\gamma i, \tau i) = [\inf E(d(Z^G_{p}, Z^T_{i}))^p]^{(1/p)}$$

where $E(Z)$ is the expected value of a random variable $Z$, $d$ is the Euclidean distance between two points, and the infimum is taken over all joint distributions of the random variables $zGi$ and $ZTi$ with probability distributions $\gamma i$ and $\tau i$, respectively.

The VNA described herein performs dynamic PDN electrical characterization from low to high frequencies and may be implemented as a soft-IP or hard-IP based VNA.

The implementation of the VNA in an integrated circuit of a processor on a printed circuit board may allow detection of tampering. In real time systems the VNA may detect tampering almost immediately and allows system response by the compromised system. Aspects may detect both non-invasive attacks (active or passive) as well as semi-or fully-invasive tampering. Tampering on systems that are stored before use (munitions, missiles, sensors, without limitation) may be detected at powerup allowing a proper response to the potential tampering. It should be noted that while some preparation work may be done by an adversary while power is off, most realistic attacks only fully work after the board is powered-up. Even monitoring attacks that are notoriously difficult to detect in real time will change the PDN electrical characteristics due to capacitors being removed and probes being attached (as in a power analysis side channel attack), or due to the proximity of an electro-magnetic (EM) probe (antenna) near to the integrated circuit (as in an electromagnetic side channel attack). Other attacks may require the removal of part of the integrated circuit packaging, or even more invasive measures, which will similarly change the PDN electrical characteristics.

Aspects may close the physical and electronic security "gap" that is present in integrated circuit, providing another layer of defense on top of other countermeasures and thus may improve the security of systems that use these chips. A PDN-based detector may detect tampering via inspection of the complete integrated circuit+board power distribution network and allow detection of tampering on other nearby board-based components such as passive circuits like capacitors or active circuits like CPUs using the PDN-based detector. Tampering may be detected by measuring changes in the PDN electrical characteristics, where the PDN may be a distributed network that comprises not only the integrated circuit but other components on the circuit board and the board itself. Either or both the false negative rate and the false positive rate of detecting true tamper events can be improved by combining the results of existing tamper detectors with a PDN-based detector.

The PDN-based detector provides the capability to know when tampering is occurring, or if it occurred while powered-down if there is any change in the PDN electrical characteristics (voltage or impedance) that can be measured when power is later reapplied.

The PDN may be affected in different frequency ranges by different changes in the PDN. For example, adding a power-sense resistor may affect the DC and very low frequency electrical characteristics, removing a power-supply capacitor far from the chip may mainly affect low to medium frequencies, and placing an EM probe in near proximity to the integrated circuit or the circuit board to which the integrated circuit is attached may affect higher frequencies in the PDN electrical characteristics. Resonances and anti-resonances in the transfer function of the PDN may be affected. Because each change can have a different phase and magnitude effect on the PDN electrical characteristics at many frequencies, many of which may be included in the reference and response signatures, spoofing the correct response to hide a malicious change is made more difficult even assuming the adversary knows the existence of the sensor. A tamper may induce a phase and magnitude change at a plurality of frequencies, across many frequencies, so that the overall affect is a multi-dimensional change in the signature. Spoofing is where one tries to make a tamper undetectable by offsetting changes. For example, the removal of a capacitor (tamper) may be canceled by another change (offset) intended to cover up the tamper so that the PDN electrical signature is unaffected (remains within the tolerance of the distance metric). Spoofing is difficult because each type of change (either a tamper or the change that attempts to offset the tamper) causes changes at multiple frequencies, and one change is not likely to cancel or offset another change across all frequencies measured in the PDN electrical signature.

Aspects may implement a vector network analyzer (VNA) on an integrated circuit. The VNA may operate over a predetermined frequency range, sample rate, and with a predetermined sensitivity. A sigma-delta quantizer may allow tones to be generated at many frequencies and with sufficient fidelity to provide a predetermined sensitivity for sensing changes in the PDN electrical characteristics (voltage or impedance) due to tampering. The VNA comprises two main parts: a current stimulus generator and a voltage response measurer. The power supply voltage, at least at the point where the waveform is injected, i.e. the supply rail voltage at the point where the waveform is injected, is what changes due to the current stimulus generation and the power supply voltage may be digitized as the voltage response measurement. The power supply voltage may be digitized at high sampling frequencies by an analog to digital converter (ADC) constructed from an FPGA soft-IP resource. Alternatively, a time-to-digital converter (TDC) sensor may be utilized. A TDC may be used to implement a suitable voltage-to-digital converter (VDC) (also known as an ADC) for digitizing the power supply voltage, in particular, as a soft-IP in a FPGA. A TDC's digitized delay is responsive to changes in the power supply voltage because the propagation times of the circuits, e.g., CMOS buffers, that make up its delay elements change when their power supply changes, making it useful for digitizing the power supply voltage. Furthermore, a TDC can be constructed using an FPGAs typical programmable resources, with the resulting voltage-to-digital converter having the sensitivity (resolution) and sample rate suitable for use in a soft-IP Vector Network Analyzer.

Aspects may be built-in, automatic, real-time, and may detect non-invasive (e.g., monitoring) attacks, and may address many types of systems without any individual manual unit inspection. The PDN-based detector may be complementary to active-attack detectors like laser and voltage glitch detectors and low-bandwidth under/over-volt-age or temperature detectors, providing defense in depth. The voltage response measurement may make passive (e.g., monitoring) or very minimally invasive (e.g., removing a decoupling cap.) attacks visible that were not detected by prior detectors, or it may be used to confirm the results of other detectors for higher detection reliability. For example, a light detector may indicate a possible laser fault attack. This is made more certain if the PDN-based detector senses a change indicating that the package lid has been removed in order to mount the laser attack.

FIG. 1 shows a block diagram of a system for a PDN-based detector that detects changes in the PDN electrical characteristics to detect tampering. A controller circuit 110 provides operation commands to a current waveform generator circuit 120, a voltage-to-digital converter circuit 130, a digital signal processing circuit 140, and a tamper detector circuit 150. A first memory circuit 160 provides waveform parameters to the controller circuit 110. The first memory circuit 160 stores the frequencies and amplitudes and other waveform characteristics needed by the current waveform generator circuit 120 to step through a pre-determined set of tests. These may be in the form of filter coefficients, normalized frequencies, frequency hopping sequence, or spreading codes, without limitation. A second memory circuit 170 may receive and enroll response data from the digital signal processing circuit 140 when the reference electrical signature is initially characterized and provide the enrolled response data later during run-time operation to the tamper detector circuit 150 for comparison to the present response for calculating the distance metric. The enrolled response data may be the reference electrical signature. The second memory circuit 170 stores the enrolled response data, i.e. the reference electrical signature responses (i.e., some representation of the complex electrical characteristics) that were obtained from those tests when the circuit board is known to be in an untampered state, e.g., during manufacturing. Later, during run-time, the vector network analyzer comprising the current waveform generator circuit 120, the voltage-to-digital converter circuit 130, the digital signal processing circuit 140 and the tamper detector 150, looks for any large deviations from the enrolled response data, i.e. from the stored reference electrical signature, as computed using some distance metric, and flagging those as tamper events. The current waveform generator circuit 120 provides a stimulus current to a power distribution network (PDN) 180 having an integrated circuit and circuit board so that a response voltage based on the stimulus current provided by the current waveform generator circuit 120 and the electrical signature of the PDN 180 is provided to the voltage-to-digital converter 130, which voltage-to-digital converter 130 converts the response voltage to a digital signal. The current waveform generator 120 may also provide a reference signal to the digital signal processing circuit 140. The reference signal may represent the analog current waveform, i.e., the stimulus, in digital form. The analog current may be generated by a DAC 129 (see FIG. 2) (for example, a "current waster") from the digital reference signal. A current waster may be made from CMOS buffers that dump energy, e.g., stored in their output capacitance, to ground and then recharge from the power supply network each time they are switched to zero and then back to one. The reference signal may be quantized by the quantizer 128 for the DAC 129 while retaining properties of the digital signal generator 122, such as high signal-to-noise ratio in the bandwidth of interest. The reference signal may be used, along with the digitized response, by the digital signal processing circuit 140 to estimate the PDN electrical characteristic. The digital signal processing circuit 140 computes the digital signal provided by the voltage-to-digital converter 130 and compares the enrolled and current signatures to make an electrical characteristic versus frequency estimation. The amount of current is represented by the digital reference signal. The electrical characteristic is computed at one or more and probably many frequency points by, for example, dividing the (complex) voltage provided to the voltage-to-digital converter 130 by the (complex) current (Ohm's law). Alternatively, impedance may be computed at frequency points. Because this is a vector calculation, the ADC may be down-converted and the result may have two channels (e.g., I & Q) and may be a vector calculation resulting in a complex vector electrical characteristic in I & Q, (real and imaginary components) or equivalently represented as magnitude and phase, i.e. the estimated PDN electrical characteristic. This electrical characteristic versus frequency estimation is provided to the tamper detector circuit 150, which determines a distance metric of electrical characteristic versus frequency estimation, i.e. the estimate PDN electrical characteristic, to the enrolled electrical characteristic versus frequency response stored in memory 170, i.e. to the enrolled PDN electrical characteristic, and outputs a tamper flag when the distance metric is greater than a threshold. The distance metric is between the enrolled response data, i.e. between the reference PDN electrical signature, and the current estimated PDN electrical signature. The distance metric reduces many points of data in two data sets to a single number that tells how "alike" or "different" the two data sets are. The distance metric, which may be a single number, may be compared to a threshold value. For example, the electrical characteristic may be a voltage or an impedance.

The circuit board may have a local chip shield over the integrated circuit that is about the size of the integrated circuit package and placed on the same side of the circuit board as the integrated circuit package and placed over the integrated circuit package. The vector network analyzer may detect changes in resonances or coupling which result in a change in the computed electrical characteristic, which may detect removal of the local chip shield. In a case where a larger whole-case shield is provided that covers all or most of the circuit board and the circuit board components, covering either one side or both sides of the printed circuit board, the vector network analyzer may detect the removal of the larger whole-case shield which result in a change in the estimated PDN electrical characteristic and at the same time reduce false positives caused by objects outside the case. An adversary may need to remove the case cover/shield and the chip shield (if present) in order to facilitate an attack, for example to be able to bring an electromagnetic (EM) probe near to the integrated circuit package in an EM monitoring attack. Removal of the shield(s) may have a larger, more easily detected effect, than proximity of the EM probe by itself. Regarding false positives, someone merely moving their hand over the integrated circuit should not be flagged as a tamper event, but the vector network analyzer may be so sensitive it detects it as such (i.e., a false positive). Depending on the penalties provided, a false positive may result in a denial of service, e.g., by erasing all the cryptographic keys and making the board useless. By placing a shield around the whole circuit card the tamper detector is less likely to detect any motion outside the shield. Yet, if the shield is removed it (or subsequent tampering) is likely to be detected (a true positive).

More than one current waveform generator 120 (providing stimulus) and/or VDC 130 (for estimating the PDN electrical signature) may be placed at multiple different places in the integrated circuit to estimate different electrical characteristic versus frequency estimations across all the available stimulus-response pairs. Stimulus-response pairs refer to all the combinations and permutations of waveform generators 120 with VDCs 130. For example, if there is one waveform generator 120 and two VDCs 130, then there are two stimulus-response pairs for estimating two PDN electrical characteristics. As another example, if there are two waveform generators 120 and three VDCs 130, then there are six stimulus-response pairs for estimating six PDN electrical characteristics. Any unique combination of one waveform generator 120 and one VDC 130 is considered a stimulus-response pair. Note that the resonances (poles) of a linear system are a global property, but the anti-resonances (zeroes) and thus the resulting overall frequency response will vary according to the coupling (based on the placement) of the particular stimulus current waveform generator and VDC used in each PDN electrical characteristic estimate. Poor coupling of either the current waveform generator 120 or the VDC 130 with respect to a resonance, e.g., formed by an inductive/capacitance tank circuit, may obscure "far away" resonances (or changes in those resonances). The PDN is a distributed network with multiple resonators and the relative positions of the stimulus current waveform generator and the response VDC with respect to each resonator determines the actual estimated PDN electrical characteristic between that stimulus/response pair. Other pairs may see the same resonances, but with different coupling factors, so that the electrical characteristic estimation for each pair may be different, with some being more sensitive to some resonators than to others. While the resonators may be a global property of the PDN, the observed anti-resonances may depend upon these coupling factors.

A tampering event will change the poles of the system but may also change the coupling (and thus the zeroes of the response) which is dependent upon the placement of each stimulus and response pair used. More current waveform generators or more voltage sensors provide more opportunity for a detectable change to be sensed as the coupling changes may be stronger and more visible to one stimulus-response pair versus another stimulus-response pair based on their placements in the power distribution network and the location of the tampering. One current waveform generator (stimulus) can be used with multiple VDCs (response), or vice-versa, to generate more possible pairings and more transfer functions, with one PDN electrical characteristic spectrum estimated for each possible combination (stimulus-response pair) of current waveform generator and VDC. For example, the electrical characteristic spectrum may be a voltage spectrum or an impedance spectrum.

The system may employ high-rate power-distribution network voltage sampling with a Voltage-to-Digital converter that is: (1) adapted from a high-resolution time-to-digital converter; (2) enabled for synchronous quadrature down-sampling; and (3) able to sense multiple voltages. In FPGA soft-IP, a TDC may be utilized as the VDC because it senses the power supply voltage since the power supply voltage affects its propagation times and thus the digital outputs. Some on-chip VNAs can sense the power-supply voltage of the I/O circuits (vs. the core voltage). Thus, it may be possible to measure the complex electrical characteristic of the I/O power supply, instead or in addition to the core power supply.

A high-rate power-distribution network voltage sampling means a "high" sampling frequency for the VDC. In an FPGA example, "high" may mean several hundred megahertz using a TDC for the VDC. In ASIC technology there may be more options for VDC/ADCs, for example a custom ADC, that aren't an option as soft-IP in an FPGA fabric. The sample rate may be high enough to detect all tampering events of interest. However, some tampering events may only change the PDN electrical characteristic at very high frequencies (e.g., approaching or above a gigahertz). Because a waveform generator or a VDC may operate upon the fundamental frequency of a signal only up to half its sampling frequency (per the Nyquist criteria), images and aliases of the fundamental signal frequencies may be used above their respective Nyquist frequencies to detect tampering events instead of or in addition to the fundamental frequency signals.

Tampering effects may manifest in phase changes in the PDN electrical characteristic, and so in one example both in-phase and quadrature baseband or intermediate-frequency (IF) components are computed from the sampled response using in-phase and quadrature representations of the carrier or an intermediate frequency signal. In this case, the current waveform generator may generate the carrier or an IF signal in both phases, i.e., as a complex signal. Alternatively, a quadrature phase-shifted second reference signal could be computed from the existing current waveform generator output or from the reference output of the sigma-delta quantizer for use in the quadrature channel of a down-converter, for example, using a Hilbert transform to shift it ninety degrees in phase. One aspect may include arbitrary-frequency digital down-converting the response electrical signature to a lower frequency and a lower sampling rate, and narrow-band digital filtering the down-converted response electrical signature to facilitate comparing the response electrical signature and the enrolled response data, i.e. the reference electrical signature.

A VNA may be attached to different power rails in the integrated circuit, for example the I/O voltage rail, thus providing visibility into different tampering events than provided by the integrated circuit core voltage. The techniques for constructing current waveform generators and voltage-to-digital converters (e.g., made from a TDC) may be different for an I/O power rail than for the main integrated circuit power rail, but the overall architecture, such as using a Sigma-Delta converter, tone, or spread-spectrum signals apply to both types of VNA. The feed-back loop 127 shown in FIG. 2, comprising a subtractor circuit 124, a configurable noise-shaping filter circuit 126 and a quantizer circuit 128, is an example of a Sigma-Delta converter.

Estimation of the PDN electrical characteristic vs. frequency can be done in many ways using a vector network analyzer comprising a current waveform generator and VDC. A digital signal processing circuit 140 (see FIG. 1) may employ arbitrary-frequency (quadrature) digital down-conversion and narrow-band digital filtering with time-domain correlation or with an adaptive (e.g., least mean square (LMS)) filter as a time-domain detector. The digital signal processing circuit 140 may be able to make broad-band spectrum estimates, for example, using the Hadamard or Discrete Fourier or Wavelet Transform, working in the frequency (i.e., transform) domain. The tamper detector circuit 150 (see FIG. 1) may use machine learning to provide techniques for building a classifier that would detect tampering events. Alternatively, the tamper detector circuit 150 may use a Wasserstein distance metric. Whatever the methodology, the tamper detector circuit 150 compares two sets of data and outputs a tamper flag if they are different enough.

Figure 2:
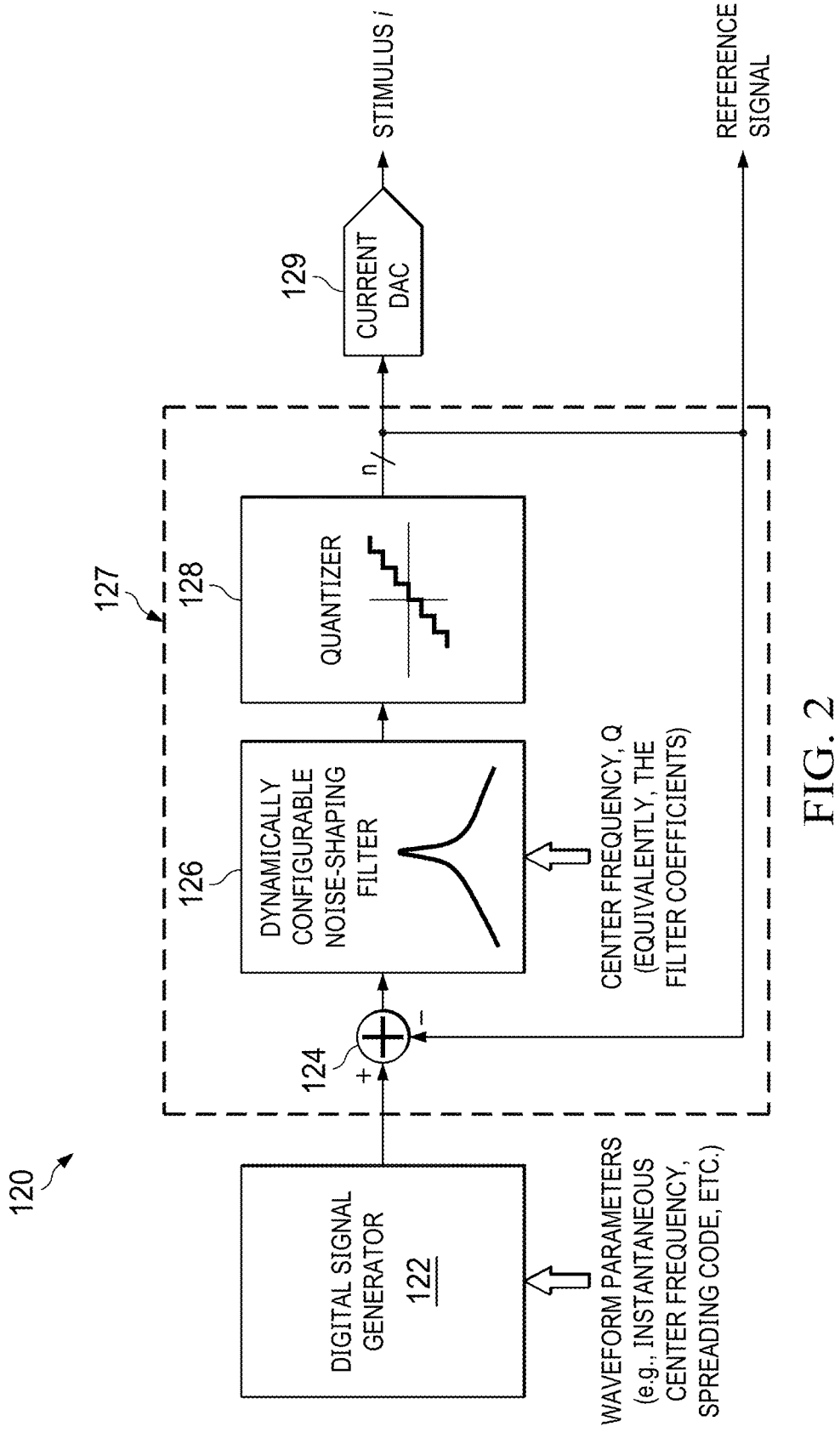
FIG. 2 shows a block diagram of a current waveform generator circuit, which was shown in FIG. 1.

The waveform generator 120 may produce various stimulus waveforms, sequenced as directed by the data in first memory 160. These waveforms may concentrate their energy in frequency bands of interest, each selected for detection of a different type of tampering event. For example, a first tone could be generated at one frequency to facilitate the detection of the removal of a board-level decoupling capacitor, and a different second tone could subsequently be generated at a much higher frequency to facilitate the detection of the removal of the integrated circuit lid. Many different waveforms could be programmed to detect a wide range of tamper events, known and unknown, across a wide range of frequencies. A current stimulus generator with a programmable single-or multi-bit Sigma-Delta-based noise shaping loop 127 (see FIG. 2) may provide arbitrary waveform quantization matched to the current waveform generator quantization, by lowering quantization noise in the frequency band currently of interest relative to quantization without noise shaping, thus improving the signal-to-noise ratio at those frequencies and the overall signal processing gain after filtering to remove the out-of-band noise generated by the user's normal circuits during operation and also the out-of-band quantization noise introduced by the tamper detector stimulus. Due to the noise shaping and subsequent filtering of the response as digitized by the VDC nearly all the quantization noise of the waveform generator and sigma-delta quantizer 128 can be removed. This allows the use of a smaller and simpler current waveform generator with a relatively coarse quantization and high quantization noise without sacrificing performance. Another benefit is that the sigma-delta loop 127 (see FIG. 2) can be driven at any arbitrary sinusoidal frequency or with any arbitrary complex waveform at any frequency from zero to the Nyquist frequency, i.e. half the sampling frequency, of the sigma-delta converter where the waveform generator and current DAC of FIG. 2 are on the same sampling frequency as the sigma-delta loop. The sigma-delta quantizer 128 may not suffer in performance or concentrate most of the energy from the quantization noise into unwanted harmonics or narrow frequency spurs, beat notes, or large distortions if the input is not related in a simple way with the sampling frequency. Due to these issues, prior art quantizers cannot process arbitrary frequency inputs with high fidelity, and thus the choices of useable stimulus frequencies is drastically reduced, especially near the Nyquist frequency. Even though the quantization may be coarse, e.g., only one or a few bits, and thus the quantization noise is large, being chaotic (especially for higher-order loop filters), the sigma-delta loop 127 (see FIG. 2) spreads the quantization noise relatively smoothly over frequencies that will be subsequently filtered away during spectrum estimation and away from the frequencies of interest, regardless of the signal's frequency relative to the sampling frequency. The noise shaping filter may dynamically adjust the noise shaping characteristic of the sigma-delta loop 127 so as to provide the lowest quantization noise in the frequency band currently under examination by the VNA. See FIG. 2.

In some aspects, the current waveform generator may process a sequence of "tests" (as are programmed into first memory circuit 160). Each of these tests may focus on a certain frequency or a narrow band of frequencies (e.g., if spread spectrum signals are used). For example, removing a board-level capacitor may change the PDN electrical characteristic at 50 MHz. To enable flagging this tamper, the first memory circuit 160 may include a test for measuring the PDN complex electrical characteristic at 50 Mhz. Likewise, the enrolled values of the PDN complex electrical characteristic for the untampered circuit board at that frequency may be stored in second memory circuit 170. If the response PDN electrical characteristic signature result deviates more than a threshold value from the enrolled values of the of the PDN complex electrical characteristic, a tamper event is declared. Other types of tampering (e.g., removing the lid or opening the case) may be indicated at different frequencies, for example, 250 MHz or 1,200 MHz. Many frequencies may be tested (e.g., several dozen) to flag different anticipated tampers. Depending upon the signal processing used, the tests may be tested sequentially, or with some techniques (e.g., FFT) test may be performed simultaneously via broadband stimuli and response measurements used to compute the spectrum points in the frequency domain, or with other techniques (e.g., using an adaptive filter or machine learning) in other domains (e.g., the time domain or z-domain) without limitation.

The current waveform generator may include the option of using digital frequency synthesis to generate arbitrary (e.g., sinusoidal or other) stimulus waveforms with energy at any frequency from zero to the Nyquist frequency of the waveform samples. The current waveform generator may have a tone generator or spread-spectrum generator and synchronous sensor with a "secret" spreading code (for low probability of intercept, LPI), which may be applied relatively broadband, or in narrow(er)-bands (i.e., just around carrier frequencies). The spreading code may be removed ("de-spread") from the response signal with correlators using the same pseudo-random spreading code that the waveform generator used for spreading, thus providing signal processing gain. An advantage of spreading the stimulus and de-spreading the response is that noise added by the user's normal operating circuits will be pseudo-randomly spread by the de-spreading operation, making the tamper detector much more immune to spurs and tones generated in the power supply network by the normal operation of the user circuits. The system may have a frequency-hopping generator (stimulus) and a VDC (response) with signal processing that hops in synchronism with the generator to recover the baseband or IF signals. The hopping frequencies may be broadband or in narrow(er)-bands (also for LPI). It may be desirable that the vector network analyzer can run without the adversary knowing it is there until penalties have been applied; or at least not knowing at what frequencies it is operating at, making counter-countermeasures more difficult.

Alternatively, the circuits used to generate the current waveform signature (see FIGS. 1 and 2) may use different sampling frequencies than voltage-to-digital converter circuit 130 (see FIG. 1) used to read the response signature so that images and aliases at higher frequencies may be used to estimate electrical characteristics above the two Nyquist frequencies, i.e. the Nyquist frequencies of the VDC 130 and the current waveform generator 120.

The vector network analyzer may intentionally generate and sense the PDN electrical characteristic spectrum at chosen frequencies or frequency bands above the Nyquist frequency of either the stimulus or response signals using aliased signals and "mutually prime" sampling frequencies for the current waveform generator 120 and the voltage-to-digital converter circuit 130, selected for separating and sensing multiple sensed aliases from one generator's harmonics or aliases. Note that a current waveform generator built using integrated circuit resources may be made very impulsive in nature due to the fast switching speeds of the integrated circuit, and thus can generate many high-frequency images above the Nyquist frequency in addition to its fundamental frequency component(s). These high-frequency images above the Nyquist frequency have known relationships to the fundamental signal's frequency and its sampling frequency.

Also note that a TDC used as a voltage-to-digital converter 130 effectively samples the power-supply voltage at points along its delay line where the voltage affects the delay, for example, in the CMOS buffers used. There may be little to no filtering (besides the PDN itself) in the context of a traditional anti-aliasing filter. The TDC's sampling function will not only sample signals below the Nyquist frequency, but also will alias higher frequency responses into the digital output samples, according to their frequency and the shape of the sampling function and, of course, the PDN. The VNA may use a phase-locked loop (PLL) or other means to adjust the ratio of the stimulus and/or response sampling frequencies to one another, causing the lower and higher order aliases to be differentiated from each other rather than all aliasing to a common frequency with a shared sampling frequency. In particular, a phase-locked loop circuit may adjust the frequency of the current stimulus waveform generated by current waveform generator 120 and adjust the sampling frequency of the voltage-to-digital converter 130. In this way, the usefulness of the VDC (response sensor) can be extended to several times the Nyquist frequency, which may be set by the maximum clock frequency at which the circuits of the vector network analyzer may run. The PDN vector network analyzer may be used as a counterfeit detector for new systems by comparing a spectrum response signature taken during manufacturing or provisioning of the system and comparing it to a reference electrical signature representing a large population of authentic systems; flagging the system as a potential counterfeit system if the distance between the two is greater than a threshold. Because counterfeit detection is done in a factory or manufacturing environment, the population reference electrical signature may be stored either on (e.g., in memory 170) or off the system (e.g., in a manufacturing tester), as is most convenient. Likewise, all signal processing to estimate the electrical characteristic and compute the distance metric and detection with respect to a threshold can be done outside the integrated circuit in a trusted environment. The PDN vector network analyzer may later, i.e., at run-time, become a near-continuous tamper detector after enrollment of a PDN reference electrical signature that may have been determined on the device itself which it compares frequently to fresh real-time estimates of the PDN electrical characteristic. Slow continuous adaptation may be used to track and remove temperature effects during the operation of the tamper detector. Counterfeits may be detected by estimating the electrical characteristic of the PDN, computing the distance between the estimated electrical characteristic and an electrical characteristic estimated from the PDN of a known-good population of similar authentic systems, and triggering an alarm if the distance is greater than a threshold.

Counterfeits may be detected when the user system/board is integrated into a larger system (e.g., an electro-mechanical product implementing several electrical components) by testing to see if it is authentic or a counterfeit. Presumably, the vector network analyzer would generate different signatures due to their differences in design, components used, without limitation. Counterfeit detection may be relevant to FPGA implementations where there are independent means to determine that the FPGA firmware or software is correct and not spoofing the counterfeit detection output.

A PDN-based detector may detect counterfeits by estimating the electrical characteristic of the PDN, computing the distance between the estimated electrical characteristic and the electrical characteristic of a known-good population of similar PDNs, and triggering an alarm if the distance is greater than a threshold. For example, the electrical characteristic may be a voltage or an impedance.

FIG. 2 shows a block diagram of a current waveform generator circuit 120, which was shown in FIG. 1. The current waveform generator circuit 120 may have a digital signal generator circuit 122 that receives waveform parameters, e.g., instantaneous center frequency, spreading codes, sequencing information, and other parameters without limitation. The digital signal generator circuit 122 generates signals according to the desired tests described in first memory circuit 160. These may be sequenced, for example, it may be a series of pure tones at different frequencies, each held for a certain length of time. But more complex waveforms are possible, such as a carrier modulated by a spread-spectrum signal. Alternatively, the frequencies may be rapidly hopping instead of dwelling for a long time at each frequency. Of course there are different costs and benefits of using different waveforms and subsequent signal processing techniques. The current waveform generator circuit 120, with the sigma-delta loop 127, can reproduce waveforms with high fidelity without problems like limited frequency choices, excessive harmonic noise, and beat notes, without limitation.

The digital signal generator circuit 122 provides a signal to a first input of a subtractor circuit 124, wherein the output of digital signal generator circuit 122 is a desired waveform in relatively high-precision (bit count), for example, a pure tone, or a spread-spectrum signal, without limitation. The subtractor circuit 124 provides the difference (a.k.a. the error) signal between the signal provided by the digital signal generator circuit 122 and a quantized reference signal to a dynamically configurable noise-shaping filter circuit 126. As shown in FIG. 2, the quantized reference signal is the output of the sigma-delta loop 127, which is the output of the sigma-delta quantizer 128 driving the output of the sigma-delta loop 127. It is the reduced resolution (i.e., lowered bit count) representation of the waveform. For example, the waveform generator 122 may have an output resolution of 12 bits but the quantizer 128 inside the sigma-delta loop 127 may have a much lower resolution such as one to four bits. The dynamically configurable noise-shaping filter circuit 126 has a center frequency and quality factor (Q) (equivalently, dynamically set by the coefficients of the configurable noise-shaping filter circuit 126), and provides a signal to a quantizer circuit 128. The sigma-delta quantizer circuit 128 provides n-bit noise-shaped quantities to: (1) a current digital-to-analog converter (DAC) 129, (2) the subtractor circuit 124 as the quantized reference signal, and (3) a quantized reference output signal. In particular, the sigma-delta quantizer circuit 128 reduces the number of bits representing the waveform without completely destroying its most important aspects such a good signal-to-noise ratio in the frequency band currently of interest, and the faithful reproduction of tones or other signals regardless of their relationship to the sampling frequency of the sigma-delta loop 127 and the current DAC 129 that it feeds. The current digital-to-analog converter (DAC) 129 outputs a noise-shaped and quantized stimulus current (i) that stimulates the PDN.

Each of the circuits may be implemented by instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. The circuits may be implemented by instructions for execution by a processor through, for example, a function, application programming interface (API) call, script, program, compiled code, interpreted code, binary, executable, executable file, firmware, object file, container, assembly code, or object. For example, circuits may be implemented by instructions stored in a non-transitory medium such as a memory that, when loaded and executed by a processor (or any other suitable process), causes the functionality of circuits described herein.

Figure 3:
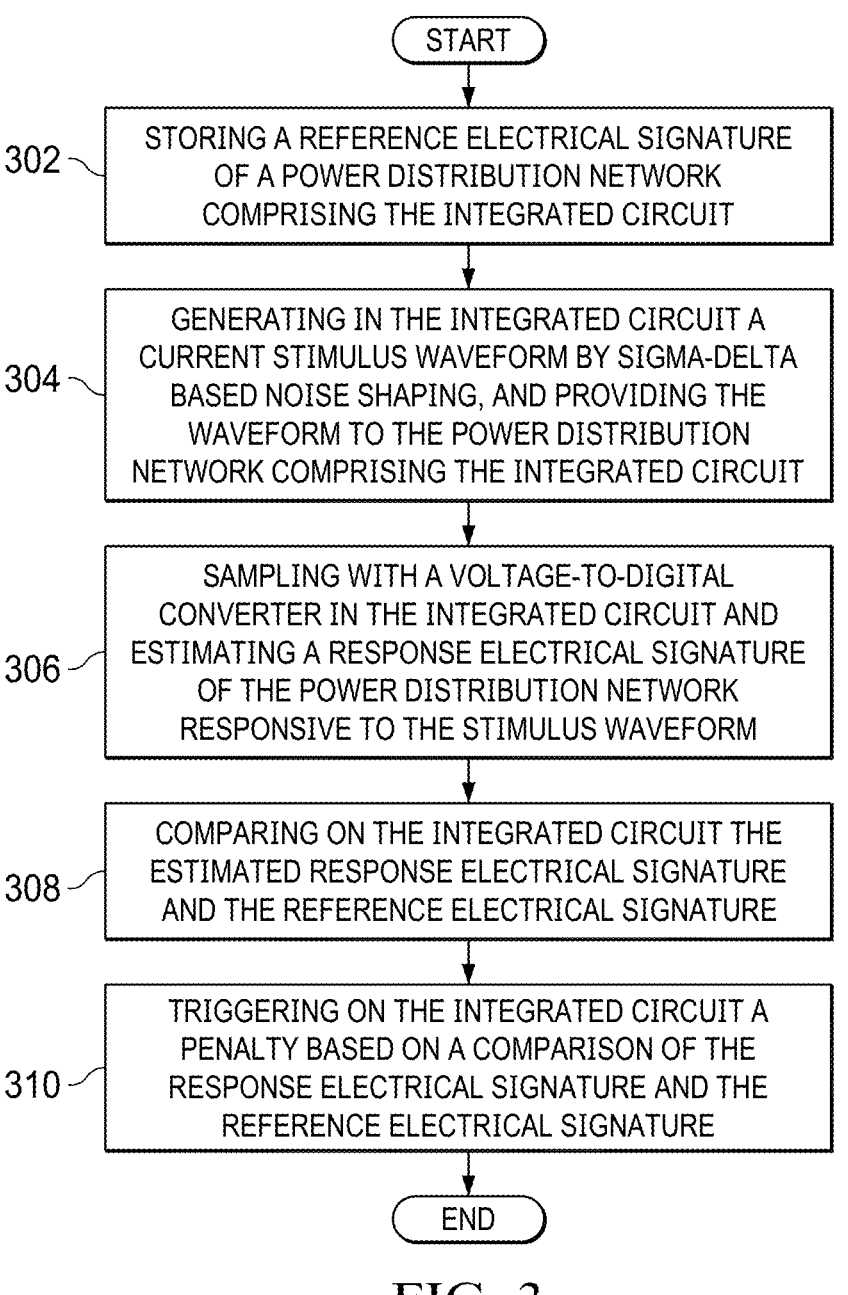
FIG. 3 shows a flow chart of a method for detecting tampering by sensing changes in a dynamic electrical characteristic of a PDN of an integrated circuit and the printed circuit board to which it is attached by generating a current stimulus waveform by sigma-delta based noise shaping.

FIG. 3 shows a method for analyzing power supply electrical characteristic to detect tamper attempts in real time on operating systems. A reference electrical signature of a power distribution network of the integrated circuit is stored 302 in a non-volatile memory of the integrated circuit that could be either integral or external to the integrated circuit. A current stimulus waveform is generated 304 on the integrated circuit by sigma-delta based noise shaping and the current stimulus waveform is provided to the power distribution network of the integrated circuit and the circuit board it is part of. The power distribution network is sampled 306 with a voltage-to-digital converter on the integrated circuit and a response electrical signature of the power distribution network responsive to the stimulus waveform is estimated. The response electrical signature and the reference impedance signature are compared 308. A penalty based on a comparison of the response electrical signature and the reference electrical signature is triggered 310 in the event that the response electrical signature and the reference electrical signature exhibit a distance above a threshold. For example, the reference and response electrical characteristic may be voltage or impedance.

Figure 4:
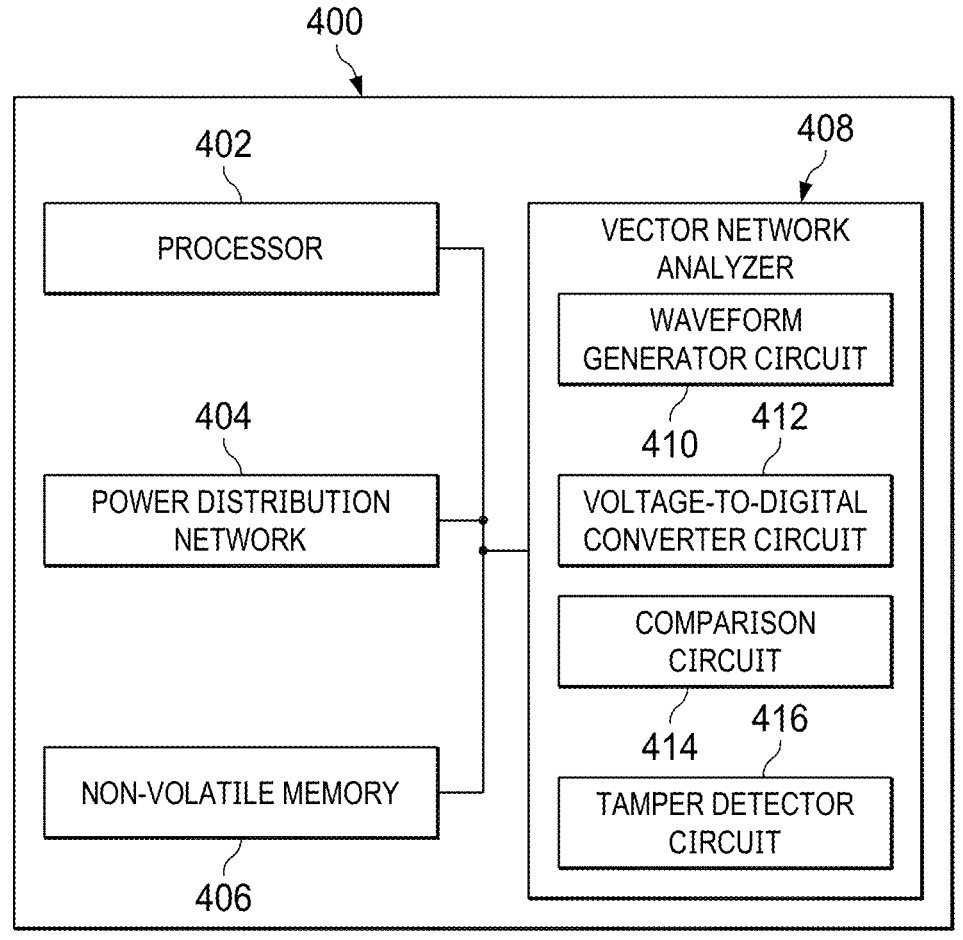
FIG. 4 shows an integrated circuit having a processor, a power distribution network, a non-volatile memory to store a reference electrical signature of the power distribution network, and a vector network analyzer of the power distribution network.

FIG. 4 shows an integrated circuit 400. The integrated circuit 400 has a processor 402, a power distribution network 404, a non-volatile memory 406 to store a reference electrical signature of the power distribution network, and a vector network analyzer 408 of the power distribution network 404. The vector network analyzer 408 is on the integrated circuit 400. The vector network analyzer 408 has a waveform generator circuit 410 to generate a current stimulus waveform and provide the waveform to the power distribution network 404, wherein the waveform generator circuit 410 is a sigma-delta-based noise shaping waveform generator circuit. The vector network analyzer 408 has a voltage-to-digital converter circuit 412 to sample a response electrical signature of the power distribution network responsive to the stimulus waveform that may include aliases of response signals above the Nyquist frequency of the voltage-to-digital converter. The vector network analyzer 408 has a comparison circuit 414 to compare the response electrical signature and the reference electrical signature, wherein the reference electrical signature and the response electrical signature are voltage or impedance estimates. The vector network analyzer 408 has a tamper detector circuit 416 to detect a tamper and trigger a penalty based on a comparison by the comparison circuit of the response electrical signature and the reference electrical signature in the event that response electrical signature and the reference electrical signature exhibit a distance above a threshold.

Figure 5:
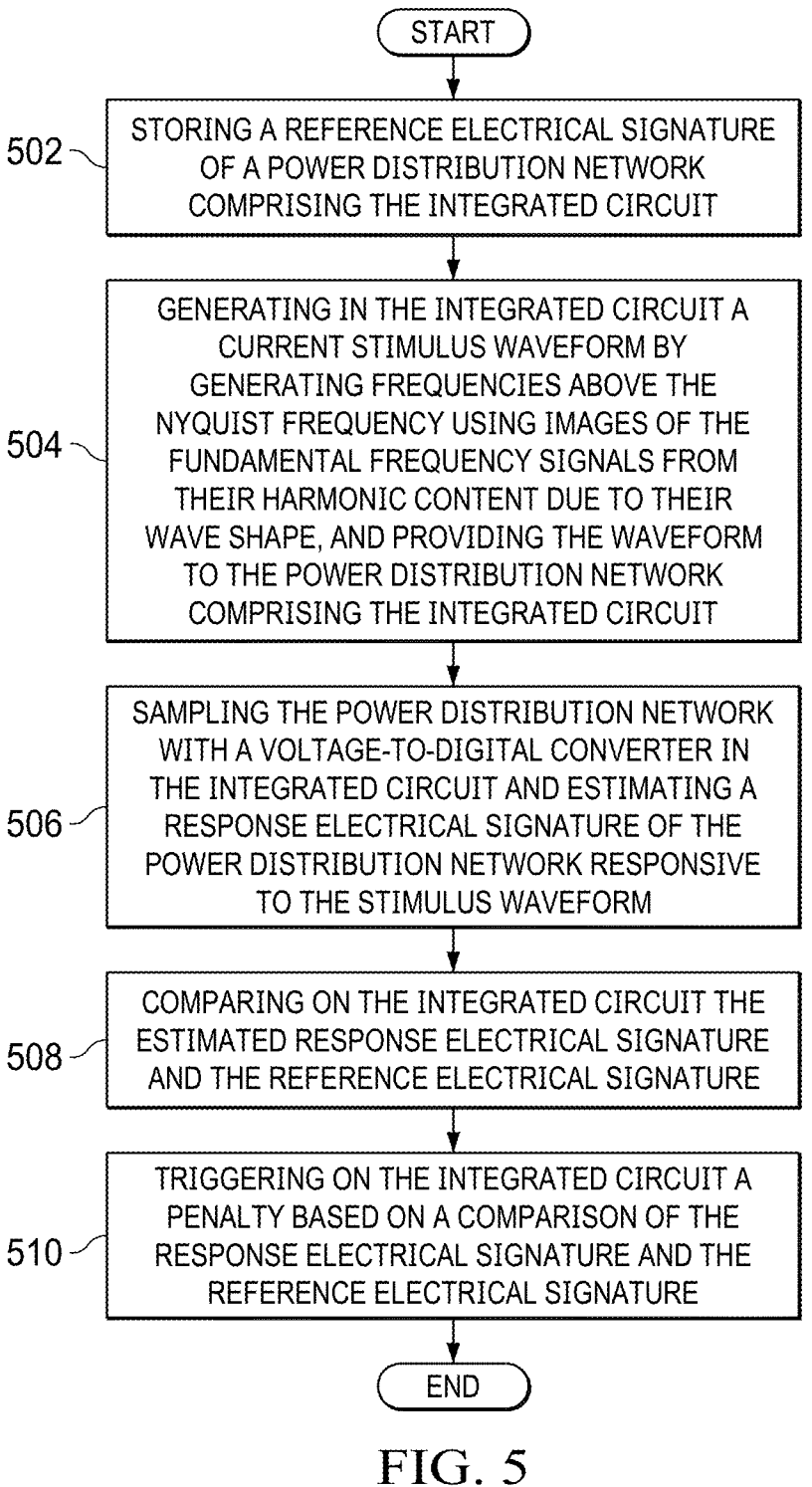
FIG. 5 shows a flow chart of a method for detecting tampering by sensing changes in a dynamic electrical characteristic of a PDN of an integrated circuit and the printed circuit board to which it is attached by generating a current stimulus waveform by generating frequencies above the Nyquist frequency using images of the fundamental frequency signals from their harmonic content due to their wave shape.

FIG. 5 shows a flow chart of a method for analyzing power supply electrical characteristic to detect tamper attempts in real time on operating systems. A reference electrical signature of a power distribution network of the integrated circuit is stored 502. A current stimulus waveform is generated 504 by generating frequencies above the Nyquist frequency of the generator using images of the fundamental frequency signals from their harmonic content due to their wave shape. The current DAC may be implemented in the form of current wasters that dump some power supply current to ground at selected sampling instants according to the desired stimulus waveform (e.g., a tone). If the wave shape of the current spikes thus generated are very short in time, they will have an approximately inversely proportional high frequency energy spectrum, with images of the fundamental waveform (e.g., tone) appearing at several frequencies above the Nyquist frequency of the DAC. The DAC provides the current stimulus waveform to the power distribution network of the integrated circuit. The power distribution network is sampled 506 with a voltage-to-digital converter in the integrated circuit and a response electrical signature of the power distribution network responsive to the stimulus waveform is estimated. The digitized samples may include aliases of response signals above the Nyquist frequency of the voltage-to-digital converter. The estimated response electrical signature and the reference electrical signature are compared 508 on the integrated circuit. A penalty based on a tamper detection by comparison of the response electrical signature and the reference electrical signature is triggered 510 by the integrated circuit.

Although examples have been described above, other variations and examples may be made from this disclosure without departing from the spirit and scope of these disclosed examples.

The invention claimed is:

1. A method comprising:
storing a reference voltage signature of a power distribution network comprising an integrated circuit;
generating in the integrated circuit a current stimulus waveform by sigma-delta based noise shaping, and providing the waveform to the power distribution network comprising the integrated circuit;
sampling the power distribution network with a voltage-to-digital converter in the integrated circuit and estimating based at least partially on the sampled power distribution network a response voltage signature of the power distribution network responsive to the stimulus waveform;
comparing on the integrated circuit the estimated response voltage signature and the reference voltage signature; and
triggering by the integrated circuit a penalty based on a comparison of the response voltage signature and the reference voltage signature.

2. The method as claimed in claim 1, wherein triggering the penalty is in the event that the response voltage signature and the reference voltage signature exhibit a distance greater than a threshold.

3. The method as claimed in claim 1, wherein generating the current stimulus waveform comprises generating selected from: spread-spectrum generating, tone generating, and frequency-hopping generating.

4. The method as claimed in claim 1, comprising:
filtering the voltage; and
arbitrary-frequency digital down-converting the voltage to a lower frequency and a lower sampling rate.

5. The method as claimed in claim 1, wherein comparing the response voltage signature and the reference voltage signature comprises using a Wasserstein distance metric.

6. The method as claimed in claim 1, wherein the penalty is selected from: setting a flag on the integrated circuit, resetting the integrated circuit, and erasing information from the integrated circuit.

7. The method as claimed in claim 1, wherein the voltage-to-digital converter is a time-to-digital converter.

8. The method as claimed in claim 1, wherein the estimating the response voltage signature comprises selecting from the Hadamard Transform, Wavelet Transform, and the discrete Fourier Transform for binning measurements in the frequency domain, and adaptive filtered time-domain detector measurements.

9. The method as claimed in claim 1, wherein generating the current stimulus waveform comprises generating mutually prime frequencies and sampling with the voltage-to-digital converter the response voltage signature comprises sampling mutually prime frequencies to sense and separate multiple sensed aliases from current stimulus waveform harmonics or images.

10. The method as claimed in claim 1, comprising slow continuous adapting to track and remove temperature effects.

11. The method as claimed in claim 1, comprising detecting counterfeits by estimating a voltage characteristic of the power distribution network, computing the distance between the estimated voltage characteristic of the power distribution network and a voltage characteristic of a known-good population of similar power distribution networks, and triggering an alarm if the distance is greater than a threshold.

12. The method as claimed in claim 1, wherein generating in the integrated circuit a current stimulus waveform comprises generating a plurality of current stimulus waveforms.

13. The method as claimed in claim 1, wherein sampling with the voltage-to-digital converter in the integrated circuit the response voltage signature comprises sampling with a plurality of voltage-to-digital converters in the integrated circuit to estimate a plurality of response voltage signatures and comparing the plurality of response voltage signatures to a plurality of reference voltage signatures.

14. The method as claimed in claim 13, wherein sampling with the voltage-to-digital converter in the integrated circuit the response voltage signature comprises sampling multiple voltages.

15. A method comprising:
   storing a reference voltage signature of a power distribution network comprising an integrated circuit;
   generating in the integrated circuit a current stimulus waveform by generating frequencies above the Nyquist frequency using images of the fundamental frequency signals from their harmonic content due to their wave shape, and providing the waveform to the power distribution network comprising the integrated circuit;
   sampling the power distribution network with a voltage-to-digital converter in the integrated circuit and estimating a response voltage signature of the power distribution network responsive to the stimulus waveform;
   comparing on the integrated circuit the estimated response voltage signature and the reference voltage signature; and
   triggering on the integrated circuit a penalty based on a comparison of the response voltage signature and the reference voltage signature.

16. The method as claimed in claim 15, comprising a phase-locked loop circuit to adjust the sampling frequency of the current stimulus waveform or to adjust the sampling frequency of the voltage-to-digital converter.

17. The method as claimed in claim 15, where sampling the power distribution network with a voltage-to-digital converter comprises sampling the voltage response signal having a response at one or more frequencies higher than the Nyquist frequency of a sampler and estimating a response electrical signature comprises using aliases of the response signals.

18. An integrated circuit comprising:
   a processor;
   a power distribution network having a reference voltage signature; and
   a vector network analyzer, wherein the vector network analyzer comprises:
      a waveform generator circuit to generate a current stimulus waveform by sigma-delta based noise shaping, and provide the waveform to the power distribution network;
      a voltage-to-digital converter circuit to sample a voltage and to estimate a response voltage signature of the power distribution network responsive to the stimulus waveform;
      a comparison circuit to compare the estimated response voltage signature and the reference voltage signature; and a tamper detector circuit to trigger a penalty based on a comparison by the comparison circuit of the response voltage signature and the reference voltage signature.

19. The integrated circuit as claimed in claim 18, wherein the tamper detector circuit triggers the penalty in the event the response voltage signature and the reference voltage signature exhibit a distance greater than a threshold.

20. The integrated circuit as claimed in claim 18, wherein the waveform generator circuit generates the current stimulus waveform by a generating selected from: spread-spectrum generating, tone generating, and frequency-hopping generating.

21. The integrated circuit as claimed in claim 18, comprising:
   an arbitrary-frequency digital down-convertor circuit to convert the voltage to a lower frequency and a lower sampling rate; and
   a narrow-band digital filter circuit to filter the down-converted voltage to facilitate comparing the response voltage signature and the reference voltage signature.

22. The integrated circuit as claimed in claim 18, wherein the comparison circuit uses a Wasserstein distance metric.

23. The integrated circuit as claimed in claim 18, wherein the penalty is selected from:
   setting a flag on the integrated circuit, resetting the integrated circuit, and erasing information from the integrated circuit.

24. The integrated circuit as claimed in claim 18, comprising a controller of the waveform generator circuit, the convertor circuit, the comparison circuit, and the tamper detector circuit.

25. The integrated circuit as claimed in claim 18, wherein the voltage-to-digital converter is a time-to-digital converter.

26. The integrated circuit as claimed in claim 18, wherein the voltage-to-digital converter circuit comprises a broadband spectrum estimating circuit selected from Hadamard Transform estimating circuit, Wavelet Transform estimating circuit, discrete Fourier Transform estimating circuit for binning measurements in the frequency domain estimating circuit, and adaptive filtered time-domain detector estimating circuit.

27. The integrated circuit as claimed in claim 18, wherein the waveform generator circuit is to generate mutually prime frequencies and the voltage-to-digital converter circuit is to sample mutually prime frequencies to sense and separate multiple sensed aliases from current stimulus waveform harmonics or images.

28. The integrated circuit as claimed in claim 18, comprising a slow continuous adapting circuit to track and remove temperature effects.

29. The integrated circuit as claimed in claim 18, comprising a detecting circuit to detect counterfeits by estimating a voltage characteristic of the power distribution network, computing the distance between the estimated voltage characteristic and a voltage characteristic of a known-good population of similar power distribution networks, and triggering an alarm if the distance is greater than a threshold.

30. The integrated circuit as claimed in claim 18, wherein the voltage-to-digital converter samples with a plurality of voltage-to-digital converters on the integrated circuit to estimate a plurality of response voltage signatures and comparing the plurality of response voltage signatures to a plurality of reference voltage signatures.

31. A integrated circuit comprising:
   an integrated circuit comprising:
      a processor;

a power distribution network having a reference voltage signature; and a vector network analyzer of the power distribution network, the vector network analyzer in the integrated circuit, wherein the vector network analyzer comprises:

a waveform generator circuit to generate a current stimulus waveform by generating frequencies above the Nyquist frequency using images of the fundamental frequency signals from their harmonic content due to their wave shape, and provide the waveform to the power distribution network;

a voltage-to-digital converter circuit to sample voltage at a high frequency and estimate a response voltage signature of the power distribution network responsive to the stimulus waveform; and a comparison circuit to compare the estimated response voltage signature and the reference voltage signature; and a tamper detector circuit to trigger a penalty based on a comparison by the comparison circuit of the response voltage signature and the reference voltage signature.

32. The integrated circuit as claimed in claim 31, comprising a phase-locked loop circuit to adjust the frequency of the current stimulus waveform or to adjust the sampling frequency of the voltage-to-digital converter.

\* \* \* \* \*